H. C. HUNTER & J. EVERDING.
Shaft-Coupling.
No. 203,156. Patented April 30, 1878.
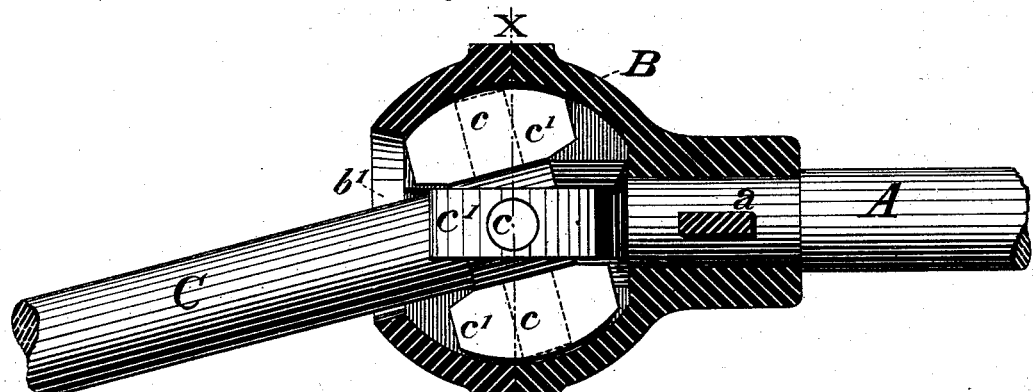
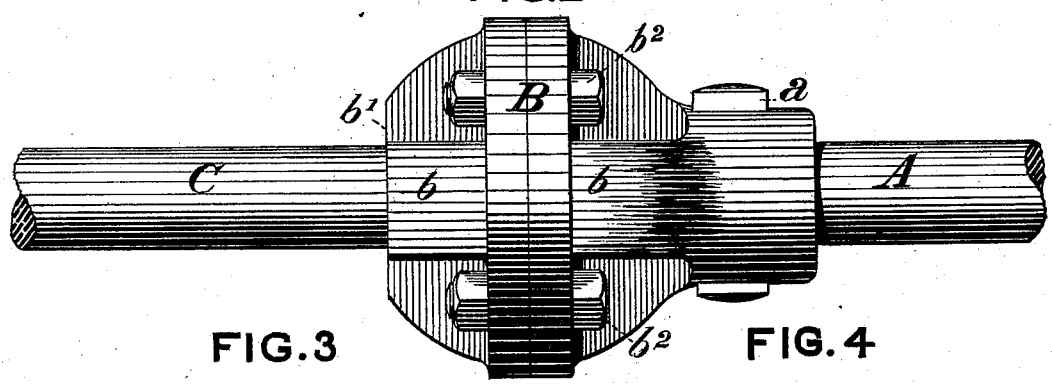
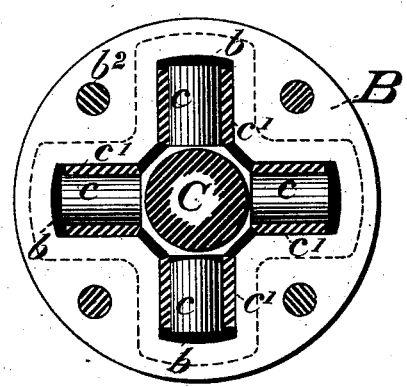
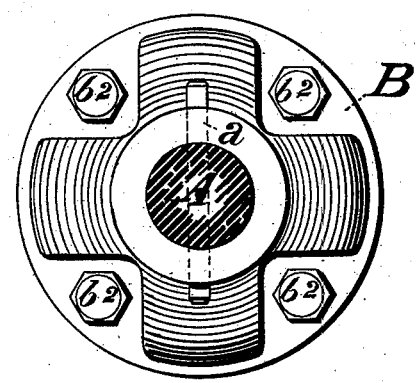
Witnesses:
Geo. A. Vaillant.
S. R. Bell.
Inventors:
H. C. Hunter, J. Everding
by J. Snowden Bell,
Atty.

UNITED STATES PATENT OFFICE.

HENRY C. HUNTER AND JOHN EVERDING, OF PHILADELPHIA, PA.; SAID HUNTER ASSIGNOR TO ABRAHAM S. JENKS, OF SAME PLACE.

IMPROVEMENT IN SHAFT-COUPLINGS.

Specification forming part of Letters Patent No. 203,156, dated April 30, 1878; application filed January 25, 1878.

*To all whom it may concern:*

Be it known that we, HENRY C. HUNTER and JOHN EVERDING, both of the city and county of Philadelphia, in the State of Pennsylvania, have jointly invented certain new and useful Improvements in Shaft-Couplings, of which the following is a specification:

The object of our invention is to provide simple, durable, and efficient means for transmitting rotary motion from one shaft to another by an end coupling or connection which will properly admit of such transmission, whether the axes of the two shafts be in line with or inclined relatively to each other; to which end our improvements consist in the combination of a socket secured upon the end of one of the shafts to be connected, and having one or more recesses or pockets, and a corresponding number of pins secured upon the end of the other shaft, each being fitted to and movable within a block which rests in one of the recesses of the socket, and has the capacity of movement therein radially to a center within the axial line of the shaft to which the socket is secured, as hereinafter more fully set forth.

In the accompanying drawings, Figure 1 is a longitudinal central section through a shaft-coupling embodying our improvements; Fig. 2, a view, in elevation, of the same; Fig. 3, a transverse section at the line $x\,x$ of Fig. 1; and Fig. 4, an end view, looking from the side of the shaft which carries the socket.

Our improvements are shown as applied to the end transmission of rotary motion from a shaft, A, to a shaft, C, or vice versa, said shafts being normally in the same axial line, but having the capacity of variation therefrom, either in a vertical or in a horizontal plane, while in rotation.

A socket, B, is secured upon one end of the shaft A by a key, $a$, and has a series of recesses or pockets, $b$—in this instance four in number—formed within it, each of these recesses being perpendicular to the axis of the shaft, and, by preference, having its outer boundary a segment of a cylinder or sphere, the center of which is a point within the axial line of the shaft A, produced beyond the end thereof, the curvature of all the recesses being concentric, and the recesses being set, as nearly as may be, at equal distances radially around the shaft.

The recesses are not necessarily, but are, preferably, segmental, as shown, and in such case the socket B is divided into two sections in a plane perpendicular to the axis of the shaft A, and passing through the center of the curve of the recesses, and the two sections are united by bolts $b^2$, the division being made to enable the pins and blocks to be introduced.

A circular opening, $b^1$, is formed in the outer end of the socket, for the passage of the shaft A, its diameter exceeding that of the shaft proportionately to the greatest admitted degree of angularity of the two shafts.

Pins or studs $c$ are formed upon or secured to the shaft C adjacent to its end, being perpendicular to the axis of the shaft, and corresponding in number and relative radial position to the recesses $b$. Each of the pins $c$ is fitted centrally in a block, $c'$, which has the capacity of free movement on the pin as a center, and is of such width as to fit neatly within one of the recesses $b$, its outer surface being a segment of a cylinder or sphere of slightly less radius than that of the recess, and its length less than that of the recess proportionately to the greatest admitted angularity of the shafts.

In applying the coupling, the smaller section of the socket B is slipped around the shaft C and the larger keyed to the shaft A, and, a block, $c'$, being placed on each of the pins $c$, the blocks are inserted into the recesses of the larger section of the socket, and the two sections firmly bolted together.

When in operation, it will be seen that the torsional strain of transmission is sustained by the pins, blocks, and side walls of the recesses, and that angular movement of either or both shafts is permitted about the intersection of the axes of the pins as a center.

It will be further obvious that either of the shafts A or C may act immaterially as a driver or a driven shaft.

We claim as our invention and desire to secure by Letters Patent—

The combination, in a shaft-coupling, of a socket secured upon a shaft, and having one or more recesses radial to the axis thereof, and blocks fitting into said recesses, and having the capacity of movement therein upon pins radially secured upon the end of another shaft, the combination being and operating as and for the purpose set forth.

HENRY C. HUNTER.
JOHN EVERDING.

Witnesses:
J. SNOWDEN BELL,
GEO. A. VAILLANT.